United States Patent
Farhan et al.

(10) Patent No.: US 10,923,152 B2
(45) Date of Patent: Feb. 16, 2021

(54) PARTIAL UPDATES FOR SHINGLED MAGNETIC RECORDING DEVICES

(71) Applicant: Amazon Technologies, Inc., Seattle, WA (US)

(72) Inventors: Munif M. Farhan, Bellevue, WA (US); Thomas Grant Slatton, Seattle, WA (US); Douglas Stewart Laurence, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/667,138

(22) Filed: Oct. 29, 2019

(65) Prior Publication Data

US 2020/0066303 A1   Feb. 27, 2020

Related U.S. Application Data

(60) Division of application No. 16/005,135, filed on Jun. 11, 2018, now Pat. No. 10,460,759, which is a continuation of application No. 15/714,676, filed on Sep. 25, 2017, now Pat. No. 9,997,194.

(51) Int. Cl.
*G11B 20/12* (2006.01)
*G11B 20/10* (2006.01)

(52) U.S. Cl.
CPC ............ *G11B 20/1217* (2013.01); *G11B 2020/10898* (2013.01); *G11B 2020/1218* (2013.01); *G11B 2020/1242* (2013.01); *G11B 2020/1244* (2013.01); *G11B 2020/1245* (2013.01); *G11B 2020/1247* (2013.01)

(58) Field of Classification Search
None
See application file for complete search history.

(56) References Cited

U.S. PATENT DOCUMENTS

| | | |
|---|---|---|
| 9,128,820 B1 | 9/2015 | Malina |
| 9,236,086 B1 | 1/2016 | Burton |
| 9,250,811 B1 | 2/2016 | Patiejunas |
| 9,268,709 B2 | 2/2016 | Xi |

(Continued)

OTHER PUBLICATIONS

Wu et al., "Evaluating Host Aware SMR Drives," HotStorage '16 Proceedings of the 8th USENIX Conference on Hot Topics in Storage and File Systems, Denver, CO, 5 pages (Jun. 20, 2016).

*Primary Examiner* — Tan X Dinh
(74) *Attorney, Agent, or Firm* — Klarquist Sparkman, LLP

(57) ABSTRACT

Technologies are provided for partially updating shingled magnetic recording (SMR) zones in SMR storage devices. An SMR storage device can receive and process a command to update a write pointer for an SMR zone to point to an arbitrary write position within the SMR zone. A partial SMR zone update command can be received and processed to modify part of the data stored in the SMR zone. A write position within the SMR zone where data to be modified is stored can be identified. Data stored in the SMR zone following the identified write position can be read to a temporary location and modified. A write pointer for the SMR zone can be updated to point to the identified write position. The modified data can then be written to the SMR zone, starting at the write position identified by the write pointer, or to another SMR zone of the storage device.

20 Claims, 8 Drawing Sheets

(56) References Cited

U.S. PATENT DOCUMENTS

| | | | |
|---|---|---|---|
| 9,324,367 B1* | 4/2016 | Ku | G11B 5/09 |
| 9,383,923 B1 | 7/2016 | Malina | |
| 9,466,321 B1 | 10/2016 | Vinson | |
| 9,477,681 B2 | 10/2016 | Malina | |
| 9,836,232 B1 | 12/2017 | Vasquez | |
| 9,864,529 B1 | 1/2018 | Chen | |
| 9,997,194 B1* | 6/2018 | Farhan | G11B 20/1217 |
| 10,037,778 B1* | 7/2018 | Farhan | G11B 20/1217 |
| 10,120,582 B1* | 11/2018 | Farhan | G06F 3/0655 |
| 10,310,765 B1* | 6/2019 | Laurence | G06F 3/064 |
| 10,452,301 B1* | 10/2019 | Farhan | G06F 3/0647 |
| 10,460,759 B1* | 10/2019 | Farhan | G11B 20/1217 |
| 2015/0339319 A1 | 11/2015 | Malina | |
| 2016/0321174 A1* | 11/2016 | Li | G06F 12/0866 |
| 2017/0041394 A1 | 2/2017 | Mortazavi | |
| 2017/0123714 A1 | 5/2017 | Smith | |
| 2017/0123928 A1 | 5/2017 | Smith | |
| 2017/0124104 A1 | 5/2017 | Smith | |
| 2020/0167074 A1* | 5/2020 | Farhan | G06F 3/0676 |

* cited by examiner

PARTIAL UPDATES FOR SHINGLED MAGNETIC RECORDING DEVICES

CROSS REFERENCE TO RELATED APPLICATIONS

This is a Divisional application of U.S. patent application Ser. No. 16/005,135, "PARTIAL UPDATES FOR SHINGLED MAGNETIC RECORDING DEVICES," filed Jun. 11, 2018, which is a Continuation application of U.S. patent application Ser. No. 15/714,676, "PARTIAL UPDATES FOR SHINGLED MAGNETIC RECORDING DEVICES," filed Sep. 25, 2017, both of which are hereby incorporated by reference in their entirety.

BACKGROUND

Hard disk drive manufacturing appears to have reached a physical limit of storage density in hard drives that store data using the perpendicular magnetic recording (PMR). In order to continue offering hard drives with increased storage capacities, hard drive manufacturers have begun to introduce hard drives that use storage formats other than PMR, such as shingled magnetic recording (SMR) formats. SMR formats record data by partially overwriting previously recorded data. This allows SMR to offer higher storage capacities than PMR. However, due to the overlapping nature of data stored using SMR, random access write operations usually cannot be performed without risking the destruction of data stored in an adjacent storage location, where overlapping data is stored. To address this, some SMR hard drives organize storage locations into SMR zones. When a random access write operation targets a storage location in an SMR zone, all of the data in the SMR zone can be read, modified according to the write operation, and then written back to SMR zone.

DETAILED DESCRIPTION

Figure 1:
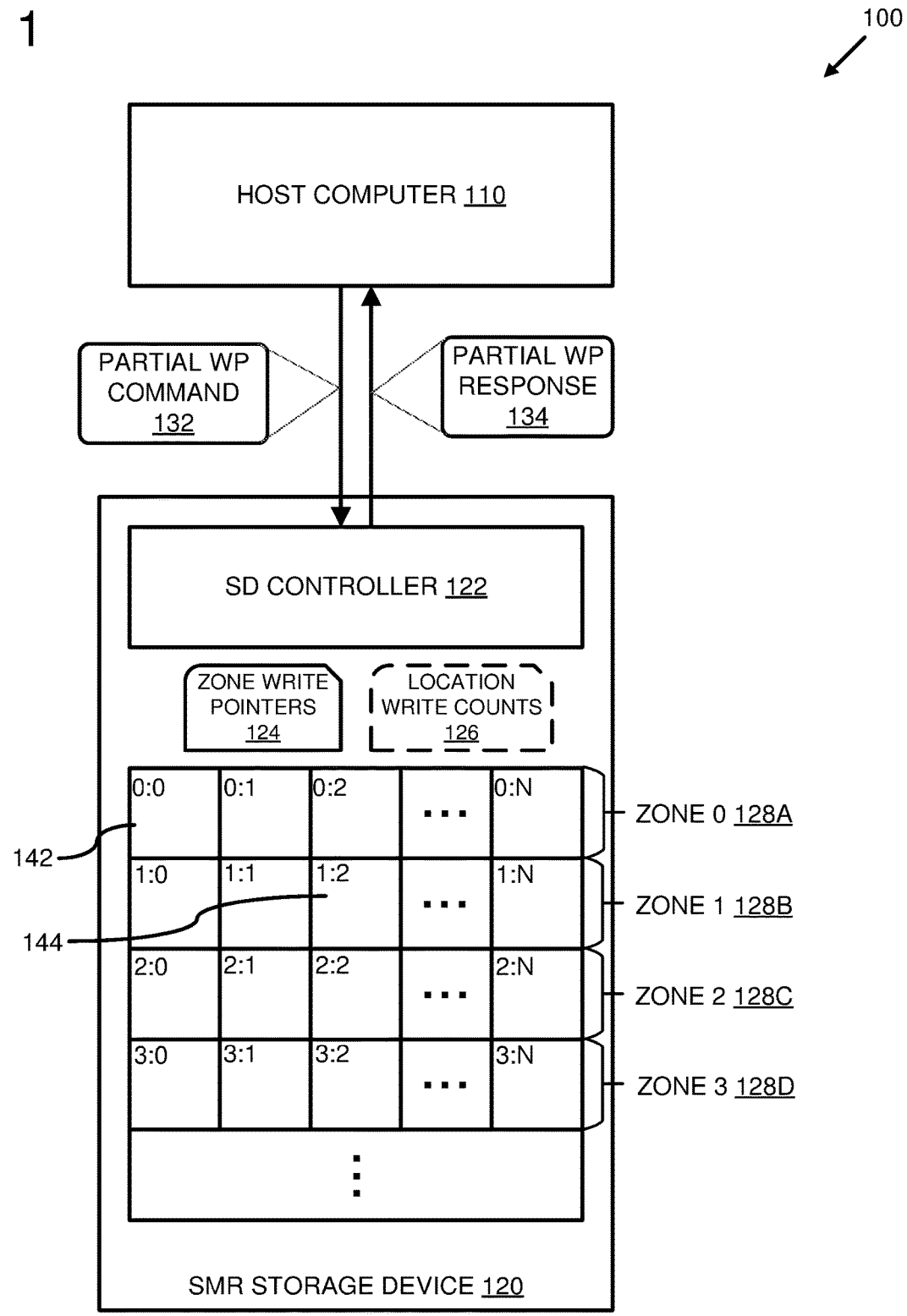
FIG. 1 is a system diagram depicting an example system configured to perform partial write pointer updates.

In at least some preexisting SMR storage devices, SMR zones are treated as fundamental units of data storage for the purposes of performing random access write operations. When an update is performed to data stored in an SMR zone of a storage device, all of the data stored in the SMR zone may be read (for example, into a memory) and modified. The modified data may then be written back to the SMR zone. This approach can introduce inefficiencies in some scenarios. When a write operation targets a write position in an SMR zone, only data stored at write positions following the targeted write position risks being overwritten. Thus, when the targeted write position is a write position other than a first write position of the SMR zone, unnecessary data (i.e., data stored at write positions in the SMR zone preceding the targeted write position) are read from the SMR zone and rewritten. In at least some cases, this read and write amplification can negatively impact the performance of random access write operations for such storage devices.

At least some of the embodiments of the technologies described herein solve these problems by enabling write pointers for SMR zones in a storage device to be partially updated to point to write positions within the SMR zones.

For example, a storage device controller of an SMR storage device can be configured to receive a command to update a write pointer for an SMR zone to point to an arbitrary write position within the SMR zone. In at least one embodiment, a host computer is configured to determine that data to be updated is stored at a write position of the SMR zone, other than a first write position of the SMR zone, and to transmit a command to the storage device to perform a partial update of the SMR zone, starting at the write position of the data to be updated. The storage device can be configured to read data from the SMR zone, starting at the identified write position, modify the data to be updated, and to update the write pointer to point to the identified write position. The storage device can then write the modified data to the SMR zone, starting at the write position indicated by the updated write pointer (or to another SMR zone of the storage device).

In at least some embodiments, partial update counters can be maintained for the write positions within the SMR zones. Before a partial update of an SMR zone is performed, a partial update counter for a write position identified by the SMR zone's write pointer can be retrieved and compared to a specified threshold value. If the partial update counter is less than the specified threshold value, then the partial update can be performed. When the partial update is performed, the partial update counter can be updated. If the partial update counter is equal to or greater than the specified threshold value, then a full update of the SMR zone can be performed instead. In at least some cases, storing data at a write position multiple times can negatively impact data stored at a preceding write position. The specified threshold value can be a number of times that data can be written to a write position before data stored at the preceding write position is negatively impacted.

In a different or further embodiment, a write pointer update command can be used to undo a delete operation. Data stored in an SMR zone can be deleted by resetting a write pointer for the SMR zone to point to a write position in the SMR zone preceding a write position where the data to be deleted is stored. Such a delete operation can be undone by transmitting a command to the storage device to update the write pointer for the SMR zone to identify a write position following a last write position where the deleted data is stored. In a scenario where data is inadvertently or maliciously deleted (and/or a scenario where a write pointer for an SMR zone is inadvertently or maliciously reset), such an undo operation can be used to recover the data that otherwise may have been lost.

FIG. 1 is a system diagram depicting an example system 100 configured to perform partial write pointer updates for shingled magnetic recording (SMR) zones (e.g., 128A-D) of a storage device 120. The example system 100 comprises a host computer 110 connected to an SMR storage device 120 comprising the SMR zones 128. The SMR storage device 120 comprises a storage device controller 122 configured to write data to the SMR storage zones 128 using a shingled magnetic recording format and to read the data written in the shingled magnetic recording format from the SMR zones 128.

The host computer 110 is configured to transmit a partial write pointer update command 132 to the storage device controller 122. The storage device controller 122 can be configured to receive the partial write pointer update command 132 and to update a write pointer for one of the storage zones 128 based on the received command 132. For example, the storage device 120 can be configured to store write pointers 124 for the SMR storage zones 128. In at least one embodiment, the zone write pointers 124 are stored in one or more storage media of the SMR storage device 120. An SMR storage zone (e.g., 128A) comprises multiple data storage locations (e.g., 142), wherein data can be stored using a shingled magnetic recording format. In at least some embodiments, the storage device controller 122 is configured to partition one or more storage media of the storage device 120 into the SMR zones 128.

The SMR zones 128 are depicted in FIG. 1 as each comprising a same number of storage locations (N). However, in at least some embodiments it is possible for the SMR storage zones 128 to contain different numbers of storage locations. The SMR zones 128 are depicted in FIG. 1 as rows of storage locations (e.g. 142). However, this is for illustration purposes and is not intended to necessarily represent a physical layout of the SMR zone storage locations on the one or more storage media of the SMR storage device 120.

A write pointer for an SMR zone (e.g., 128A) can identify a storage location within the SMR zone where a next datum can be written to the SMR zone. For example, an SMR storage zone can comprise a range of sequential storage locations on a storage medium of the SMR storage device 120. When data is written to the SMR zone, it is written starting at the storage location that the write pointer for the SMR zone identifies. After data is written to one or more storage locations of the SMR zone, a value of the write pointer for the SMR zone can be updated to point to a following storage location within the SMR zone following the last storage location to which data was written. Thus, a write pointer for an SMR zone can indicate a location up to which data has been written to the SMR zone. The write pointer can also be used to determine a number of available storage locations remaining in the SMR zone. If a write pointer for an SMR zone points to a location following the end of the SMR zone, it can be determined that the SMR zone is full (i.e., that all of the storage locations in the SMR zone are currently storing data).

Since the data blocks are written to the storage locations of the SMR zone using a shingled magnetic recording format, when a data block is written to a storage location in the SMR zone, it can partially overwrite data written to a previous storage location in the SMR zone. When a random access write operation is performed to overwrite data in a storage location of the SMR zone, data stored in a subsequent storage location may be rendered unrecoverable. To preserve data stored in the subsequent storage location, the data in the subsequent storage location can be read prior to the random access write operation and written back to the subsequent storage location as part of the write operation. As discussed above, some previous storage devices are configured to perform some random access write updates to storage locations in SMR zones by reading all data stored in an SMR zone, modifying the data, and writing the modified data back to the SMR zone.

In at least some embodiments, the example system 100 can be used to perform a random access write operation using a partial write pointer update command (e.g., 132). For example, the host computer 110 can be configured to update data stored in a storage location 144 of the SMR zone 128B. The host computer 110 can transmit one or more commands to the storage device controller 122 (for example, by using an application programming interface (API) for interacting with the SMR storage device 120) to determine a current location of a write pointer for the SMR zone 128B. The host computer 110 can then transmit one or more commands to the storage device controller 122 to read data stored in the storage location 144, and all subsequent storage locations in the SMR zone 128 up to the current location of the write pointer for the SMR zone 128B. The host computer 110 can then transmit the partial write pointer update command 132 to the storage device controller 122 to update the write pointer to point to the storage location 144. In at least one embodiment, the host computer 110 transmits the command 132 to the storage device controller 122 via an API.

The storage device controller 122 can be configured to receive the partial write pointer update command 132. The storage device controller 122 can identify the write pointer for the storage zone 128B. For example, the storage device controller can be configured to search the write pointers 124 for the write pointer associated with the SMR zone 128B. In at least one embodiment, values for the SMR zone write pointers are stored in order based on zone identifiers for the SMR storage zones 128. For example, an identifier for the SMR zone 128B can be a numerical identifier that can also serve as an index for the write pointer for the SMR zone 128B in the zone write pointers 124. Once the write pointer for the SMR zone 128B is located, the storage device controller 122 can update the write pointer to point to the storage location 144.

The storage device controller 122 can be configured to transmit a response 134 to the host computer 110, indicating that the partial write pointer update operation is complete. The host computer 110 can transmit one or more commands to the storage device controller 122 to write the updated data to the SMR storage zone 128B. The storage device controller 122 can be configured to identify the write pointer for the SMR storage zone 128B, determine that it is pointing to the storage location 144, and write the updated data to one or more storage locations of the SMR storage zone 128B, starting at the storage location 144.

In a different or further embodiment, the storage device controller 122 can be configured to write the update data to a different SMR storage zone (e.g., 128A, 128C, 128D, etc.) of the storage device 120. In such an embodiment, one or more subsequent write operations can be performed using the remaining storage locations in the SMR zone 128B. For example, the value of write pointer for the SMR storage zone 128B can indicate that the storage location 144, and subsequent storage locations in the SMR zone 128B, are available for storing data.

In at least some embodiments, the host computer 110 can be configured to receive a request to store data in the SMR storage device 120. The host computer 110 can determine that the data is to be stored in an SMR zone (e.g., 128A) of the SMR storage device 120, starting at a storage location after the beginning of the SMR zone. The host computer 110 can transmit a partial write pointer update command (e.g., 132) to the storage device controller 122 to update the write pointer to the position of the storage location after the beginning of the SMR zone. The host computer 110 can then transmit one or more commands to the storage device controller 122 to write the data to the SMR zone, starting at the position of the write pointer after the beginning of the SMR zone.

Optionally, the SMR storage device 120 can store partial write counts 126 for storage locations in the SMR storage zones 128. For example, the write counts can be stored in one or more storage media of the storage device 126. A partial write counter can be used to track how many partial write updates have been performed at a given storage location. The host computer 110 can be configured to retrieve a partial write counter associated with a storage location identified by a data write request, to determine whether the partial write counter has a value that is below a specified threshold, and to transmit the partial update command 132 to the storage device controller 122 after determining that the value of the partial write counter is below the specified threshold.

For example, the host computer 110 can receive a request to update data stored in the storage location 144 of the SMR zone 128B. The host computer 110 can transmit a command to the storage device 122 to retrieve a partial write counter for the storage location 144 from the partial write counts 126. A value of the partial write counter can indicate a number of write operations that have previously been performed, starting at the storage location 144. In at least some embodiments, the specified threshold can indicate a maximum number of write operations that can be performed at a storage location, other than a beginning storage location of an SMR zone, without risking a corruption of data stored in an immediately preceding storage location. The host computer 110 can determine that the partial write counter for the storage location 144 is less than the specified threshold, and can transmit the partial write pointer update command 132 to the storage device controller to update the write pointer for the SMR zone 128B to point to the storage location 144. In at least some embodiments, a partial write counter for a storage location can be used to determine an impact that a write operation at the storage location will have on an adjacent storage location of the SMR zone. For example, when a write operation is performed to store data at the storage location 144, the storage device controller 122 can determine that the storage location identified by the write pointer for the SMR zone 128B (storage location 144) is not the beginning storage location for the SMR zone 128B, and can increment the partial write counter for the storage location 144. In at least one such embodiment, a partial write counter for a storage location can be reset when data is written to the storage location by a write operation that did not begin at the storage location (such as a write operation that re-write the entire SMR zone). In a different or further embodiment, the partial write counter for the storage location can be reset when a refresh operation is performed at the storage location (such as an operation to remove magnetic interference, etc.).

In at least some embodiments, the host computer 110 can be configured to receive another request to store data in the storage location 144 of the SMR zone 128B. The host computer 110 can retrieve the partial write counter for the storage location 144 and determine whether the value of the partial write counter is still less than the specified threshold. In at least some such embodiments, if the value of the partial write counter for the storage location 144 is greater than or equal to the specified threshold, then the host computer 110 can write the data to the storage location 144 by rewriting all the data stored in the SMR zone 128B. For example, the host computer can read the data stored in the SMR zone 128B, modify the data by changing the data previously stored in the storage location 144 (and possibly one or more subsequent storage locations), and transmitting a command to the storage device controller 122 to update the write pointer for the SMR zone 128B to point to the storage location at the beginning of the SMR zone 128B. The host computer 110 can then transmit one or more commands to the storage device controller 122 to write the modified data back to the storage locations of the SMR zone 128B.

In at least one embodiment, the partial write counters 126 and/or the write pointers 124 are stored using a recording format other than an SMR format, such as a perpendicular magnetic recording format (PMR). Additionally or alternatively, the partial write counters 126 and/or the write pointers 124 can be stored in one or more other storage media of the storage device 120.

In any of the examples described herein, a storage device (a.k.a. an SMR storage device) can be a device capable of storing data in one or more physical storage media using a shingled magnetic recording format. For example, the storage device can be a magnetic storage device, such as a hard disk drive, that is capable of storing data in a shingled magnetic recording format on one or more magnetic disks. A storage device can comprise one or more shingled magnetic recording (SMR) zones. An SMR zone can comprise multiple storage locations in which data can be stored using the shingled magnetic recording format. In at least some embodiments, each storage location can store a single bit of data. A storage location can be associated with a write position, which indicates a position at which a write to the associated storage location can begin. Due to the overlapping nature of SMR storage formats, a write position for one storage location may occur before a position at which a write to a preceding storage location ended. A write position can be associated with a logical write position value that can be used to logically reference the write position within the SMR zone. For example, write positions within an SMR zone can be associated with numerical values such as indices, offset values, or the like. A storage device controller of the storage device can be configured to translate a logical write position value into a physical location of the write position in the SMR zone on a storage medium of the storage device.

In at least some embodiments, the storage device can be capable of storing data in one or more other storage formats as well. Examples of other storage formats include perpendicular magnetic recording (PMR), heat-assisted magnetic recording (HAMR), microwave assisted magnetic recording (MAMR), bit patterned magnetic recording (BPMR), single-level cell (SLC) storage, multi-level cell (MLC) storage, and triple-level cell (TLC) storage.

Different storage formats can have different data capacities when storing data on the same storage medium. For example, data can be stored more compactly by using an SMR format than by using a PMR format. However, the different storage formats can also have different performance characteristics. For example, in some cases random access write operations can be performed faster when data is stored using a PMR format than if the same data were stored using an SMR format.

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

In any of the examples described herein, a storage device can comprise a storage device controller. A storage device controller can comprise one or more hardware components of the storage device. The storage device controller can comprise a firmware stored in a read-only memory (ROM) of the storage device, a storage medium of the storage device, or some combination thereof. Additionally or alternatively, the storage device controller can be implemented at an intermediate layer between an application and the storage device. Such an intermediate layer controller can comprise software (such as a driver) and one or more processors, a system-on-chip (SoC), a field-programmable gate array (FPGA), and/or an application-specific integrated circuit (ASIC).

In any of the examples described herein, a data block (or block of data) can be a sequence of data units, such as bytes, bits, etc., that has a fixed size (sometimes referred to as a "block size"). In a storage device that supports data blocks, data can be read from and/or written to the storage device in units of one or more data blocks. A data block can have a physical address that identifies a position where it is stored in the storage device and a logical address, such as a logical block address (LBA), which can be used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. The host computer can be connected to the storage device via a direct connection (such as an I/O bus connection or the like) or an indirect connection (such a network connection). The host computer can be configured to transmit data access commands (such as data read and write commands) to the storage device via the connection and receive responses from the storage device via the connection. In scenarios where the host computer is connected to more than one storage device, the various connections can be of the same type or different types. In some embodiments, the host computer can comprise a storage controller connected to multiple storage devices.

Figure 2:
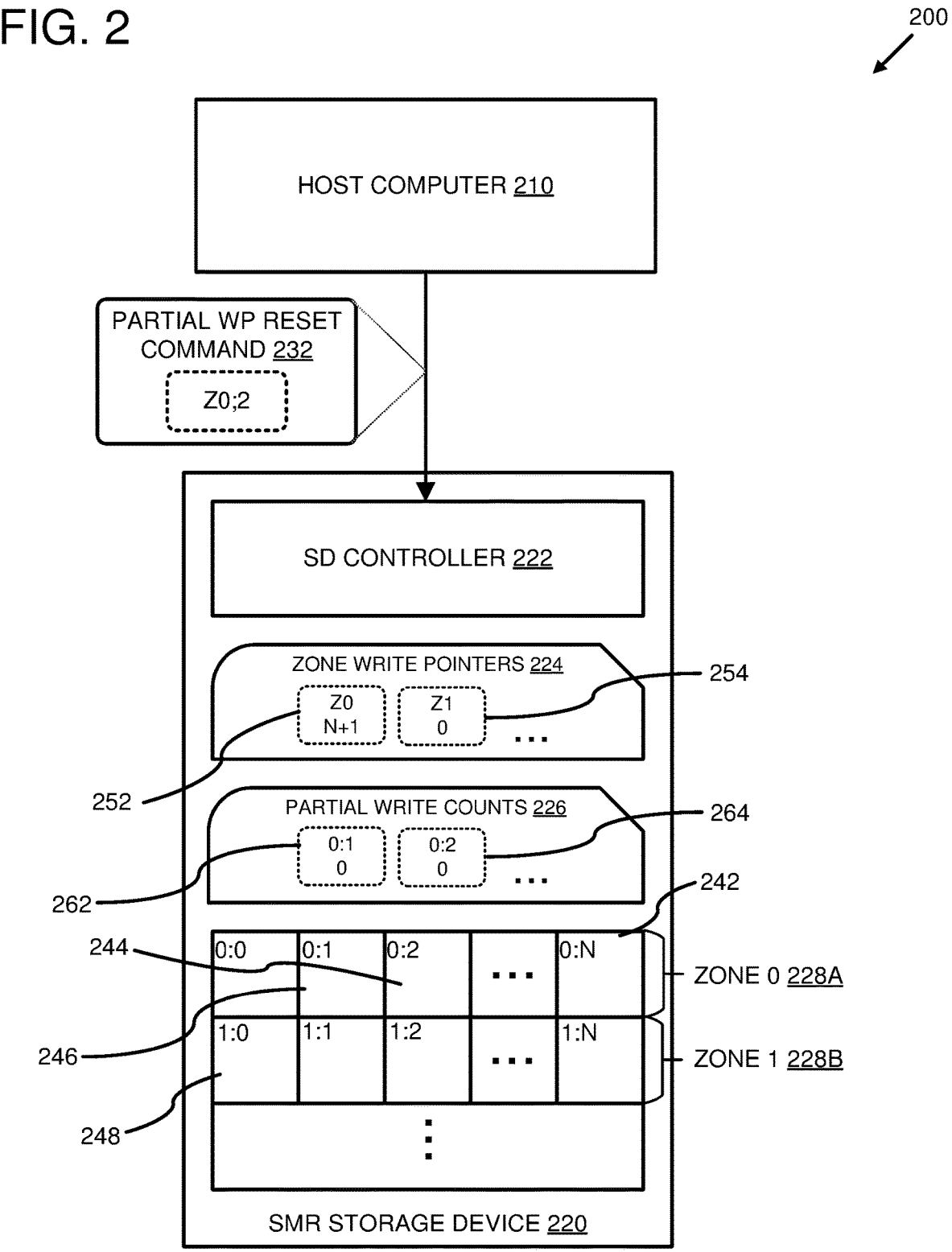
FIG. 2 is a system diagram depicting an example system 200 comprising a host computer configured to transmit a partial write pointer update command to a storage device controller.

FIG. 2 is a system diagram depicting an example system 200 comprising a host computer 210 configured to transmit a partial write pointer reset command 232 to a storage device controller 222 of a storage device 220. The example system 200 comprises a host computer 210 connected to an SMR storage device 220. The SMR storage device 220 comprises a storage medium comprising multiple SMR zones 228 (e.g., 228A, 228B, etc.), and the storage device controller 222. The SMR storage zones 228 comprise multiple sequential storage locations (e.g., 242-248, etc.) in which data can be stored using a shingled magnetic recording format.

The storage device comprises multiple SMR zone write pointers 224 associated with the multiple SMR zones 228. For example, the storage device 220 comprises a write pointer 252 associated with the SMR zone 228A, and a write pointer 254 associated with the SMR zone 228B. A write pointer can be used to identify a position (such as a storage location) within an associated SMR zone where a next data item can be written to the SMR zone. For example, the write pointer 254 indicates that a next data item can be written to the SMR zone 228B at the storage location 248 at the beginning of the SMR zone 228B. When a write pointer points as a position at a beginning of an SMR zone, it can indicate that the SMR zone is not currently storing any valid data, and that all of the storage locations in the SMR zone are available for data storage. When a write pointer for an SMR zone points to a position after a last storage location in the SMR zone, it can indicate that all of the storage locations in the SMR zone are currently storing data. For example, the write pointer 252 points to a position after the last storage location 242 in the SMR zone 228A, which can indicate that data is stored in all of the storage locations of the SMR zone 228A.

The host computer 210 can be configured to transmit a partial write pointer reset command 232 to the storage device controller 222 in order to update a value of a write pointer associated with an SMR zone of the storage device 220 to point to a position in the SMR zone, other than a starting position of the SMR zone. The partial write pointer reset command 232 comprises an identifier for an SMR zone and a write pointer position value. For example, in FIG. 2, the partial write pointer reset command 232 comprises an SMR zone identifier that identifies the SMR zone 228A, and a write pointer position value for a write position at the start of the storage location 244 in the SMR zone 228A.

The storage device controller 222 is configured to receive the partial write pointer reset command 232, to locate a write pointer for an SMR zone using the SMR zone identifier in the command 232, and to update a value of the located write pointer using the write pointer position value. For example, the storage device controller 222 can use the SMR zone identifier to locate the write pointer 252 for the SMR zone 228A. The storage device controller 222 can use the write pointer position value to update the value of the write pointer 252. In at least one embodiment, updating the value of the write pointer 252 comprises setting the value of the write pointer 252 to point to a position at the start of the storage location 244. In an embodiment where the write pointers 224 are stored in a storage medium of the storage device 220, updating the value of the write pointer can comprise writing the updated value for the write pointer to the storage medium of the storage device 220.

In at least some embodiments, the host computer 210 can be configured to receive a request to write data to a storage location of the storage device 220. The host computer 210 can be configured to identify a write position in an SMR zone for the storage location identified in the request. For example, the request can comprise a logical block address (LBA). The host computer 210 can identify a write position in one of the SMR storage zones 228 associated with the LBA. The host computer 210 can be configured to determine whether the write position is at a beginning of the SMR zone or at a position after the beginning of the SMR zone. If the write position is after the beginning of the SMR zone, the host computer 210 can be configured to transmit the partial write pointer reset command 232 to the storage device controller 222 with the identified write position set as the write pointer position value of the command 232.

The storage device can comprise partial write counts 226 associated with storage locations in the SMR zone 228. For example, FIG. 2 depicts a partial write count 262 for the storage location 246 and a partial write count 264 for the storage location 244.

Figure 3:
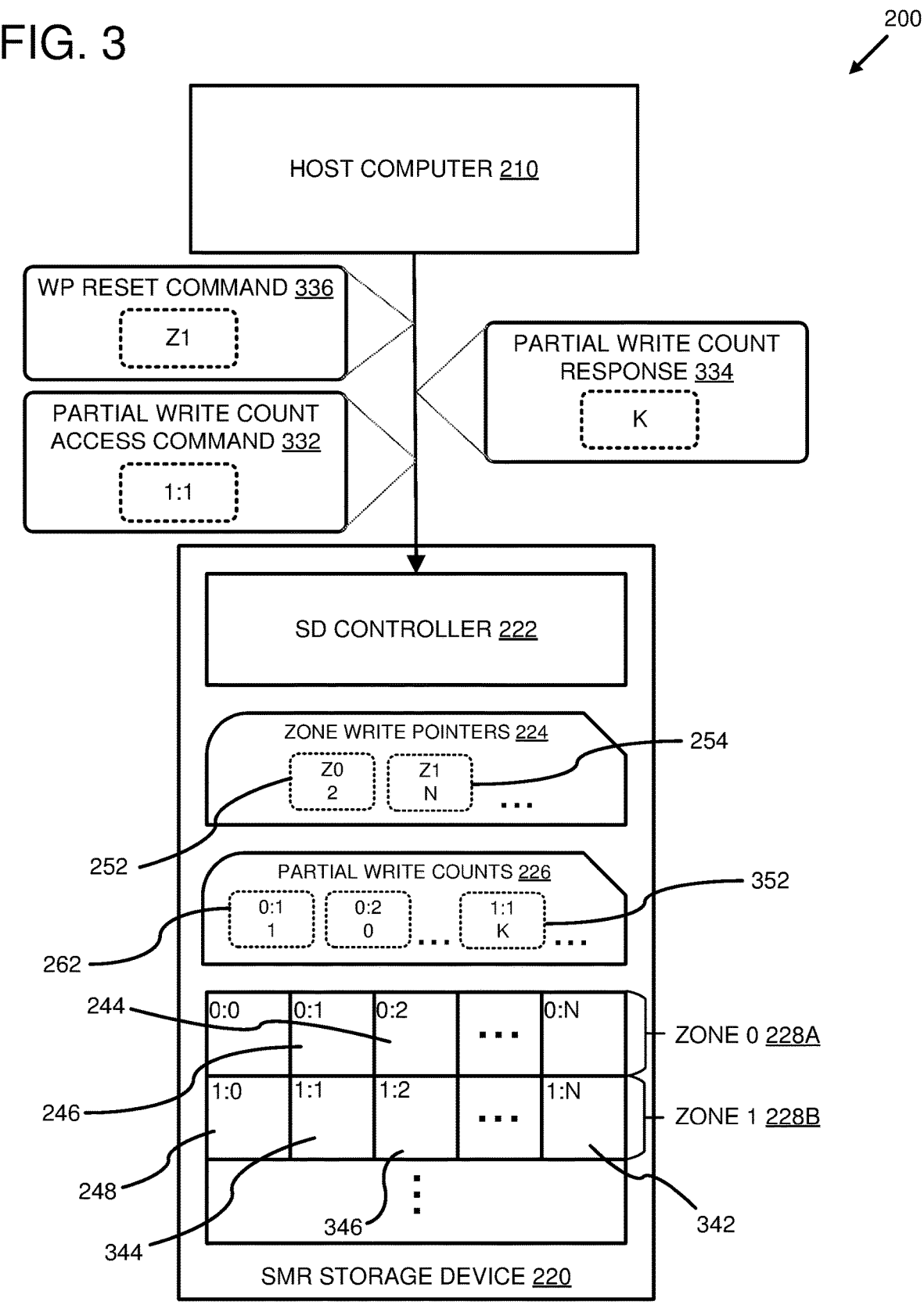
FIG. 3 is a system diagram depicting the example system 200 configured to track partial write pointer update counts.

FIG. 3 is a system diagram depicting the example system 200 configured to perform partial write pointer updates based on the write pointer update counts 226 for one or more storage locations in the SMR zones 228.

The host computer 210 is configured to transmit a partial write access command 332 to the storage device controller 222, requesting a partial write count for a storage location 344 in the storage zone 228B. The partial write access command 332 can comprise an identifier for a storage location in a storage medium of the storage device 220. For example, in FIG. 3, the command 332 is depicted as comprising an identifier for the storage location 344. In at least one embodiment, the host computer 210 is configured to update data stored in the storage device 220. The host computer 210 can determine that the data to be updated is stored in one or more storage locations of the SMR zone 228B, starting at the storage location 344. In such a scenario, the host computer 210 can be configured to transmit the partial write count access command 332 to the storage device controller 222 in order to determine whether the update to the data can be performed using a partial write pointer reset command.

The storage device controller 222 can be configured to receive the partial write count access command 332 and to retrieve a partial write counter associated with a storage location identified by the command 332. For example, the storage device controller 222 can use an identifier that is part of the partial write count access command 332 to retrieve a partial write counter 352 that is associated with the storage location 344 in the SMR zone 228B. The storage device controller 334 can be configured to transmit a response 334 to the host computer 210, comprising a value of the partial write counter 352.

The host computer 210 can be configured to receive the response 334 from the storage device controller 334 and to determine whether the value of the partial write counter for the storage location is less than a specified partial zone write limit. If the value of the partial write counter is less than the specified partial zone write limit, then the host computer 210 can transmit a partial write pointer reset command (e.g., 232 in FIG. 2) to the storage device controller. If the value of the partial write counter is greater than or equal to the specified partial zone write limit, then the host computer 210 can transmit a full write pointer reset command (e.g., 336) to the storage device controller.

For example, the host computer 210 can transmit the command 332 with the identifier for the storage location 344, and can receive the response 334, comprising the value of the partial write counter 352. If the value of the partial write counter 352 is less than the specified partial zone write limit, then the host computer 210 can transmit a partial write pointer reset command (not shown) to update a value of the write pointer 254 for the SMR zone 228B to point to a write position at a start of the storage location 344. If the value of the partial write counter 352 is greater than or equal to the specified partial zone write limit, then the host computer 210 can transmit the full write pointer reset command 336 to the storage device controller 222. The storage device controller 222 can be configured to receive the full write pointer reset command 336 and to update the value of the write pointer 254 for the SMR zone 228B to point to a write position at the beginning of the SMR zone 228B (for example, a write position at a start of the storage location 248).

In at least some embodiments, the host computer 210 can be configured to transmit a command (not shown) to the storage device controller 222, requesting a write position in an SMD zone, given a desired write position in the SMD zone. Such a command can be transmitted, for example, via an API that enables communication between the host computer 210 and the storage device controller 222. The storage device controller 222 can be configured to receive the command from the host computer and to locate a write position in the SMD zone that is a closest write position to the desired write position, and that has is associated with a partial write counter with a value below the specified partial zone write limit. The storage device controller 222 can be configured to transmit a response (not shown) to the host computer 210, comprising an identifier for the identified write position.

In at least some such embodiments, the storage device controller 222 can be configured to identify a write position in the SMD storage zone that is less than or equal to the desired write position. For example, the host computer 210 can transmit a command to the storage device controller 222, requesting a closest write position in the SMD zone 228A to the write position 244 at which a partial write pointer reset operation can be performed. The storage device controller 222 can retrieve a partial write counter, of the partial write counters 226, associated with the write position 244. If a value of the partial write counter is less than the specified partial zone write limit, then the storage device controller can transmit an identifier for the write position 244 to the host computer 210. If the value of the partial write counter is greater than or equal to the specified partial zone write limit, then the storage device controller 222 can search for a write position in the SMD zone 228A with an offset less than an offset of the write position 244 and that is associated with a partial write counter value that is less than the specified partial zone write limit. For example, the storage device controller 222 can retrieve a partial write counter associated with the write position 246. If a value of the partial write counter associated with the write position 246 is less than the specified partial zone write limit, then the storage device controller 222 can transmit an identifier for the write position 246 to the host computer 210. If the value of the partial write counter associated with the write position 246 is greater than or equal to the specified partial zone write limit, then the process can continue until a write position with a partial write count value less than the specified partial zone write limit is found, or until the first write position in the SMD zone 228A is reached, whichever comes first.

In at least some scenarios, a write position may be identified that has an offset that is greater than the desired write position (i.e., the identified write position is closer to the end of the SMD zone than the desired write position). For example, the host computer 210 can be configured to determine that data stored at the write positions 344-342 in the SMD zone 228B are invalid and the associated storage space can be reclaimed. The host computer 210 can transmit a command to the storage device controller 222, requesting a closest write position to the write position 344. The storage device controller 222 can be configured to retrieve the partial write count 352 associated with the write position 344. If a value of the partial write counter 352 is less than the specified partial zone write limit, then the storage device controller 222 can transmit an identifier for the write position 344 to the host computer 210. If the value of the partial write counter 352 is greater than or equal to the specified partial zone write limit, then the storage device controller 222 can retrieve a partial write count associated with a subsequent write position in the SMD storage zone 228B. If a value of the partial write counter associated with the subsequent write position is less than the specified partial zone write limit, then the storage device controller 222 can transmit an identifier for the subsequent write position to the host computer 210. This process can continue until a write position in the SMD zone 228B with a partial write count value less than the specified partial zone write limit threshold is found, or until the end of the SMD storage zone 228B is reached, whichever comes first.

The host computer 210 can be configured to transmit a command to the storage device controller 222 to update the write pointer for the SMD zone to point to the identified write position in the SMD zone. The host computer 210 can be configured to determine whether the identified write position is a first write position in the SMD zone, or a write position other than the first write position. If the write position is the first write position in the SMD zone, then the host computer 210 can transmit a full write pointer reset command to the storage device controller 222. If the write position is a write position other than the first write position, the host computer 210 can transmit a partial write pointer reset command to the storage device controller 222.

In at least some embodiments, the host computer 210 can be configured to receive a request to write data to a storage location of the storage device 220. The host computer 210 can be configured to determine a write position in an SMR storage zone 228 of the storage device 220 that is associated with the storage location. The host computer 210 can be configured to transmit a command to the storage device controller 222, requesting a partial reset write position in the SMR zone, wherein the command comprises an identifier for the write position associated with the storage location. The storage device controller 222 can be configured to receive the command from the host computer 210 and to retrieve a partial write count from associated with the write position and to determine that a number of partial write pointer reset commands that have targeted the storage location is greater than or equal to the specified partial zone write limit. The storage device controller 222 can be configured to determine that a number of partial write pointer reset commands that target another storage location that is closer to a beginning of the SMD zone than the storage location is less than the specified partial zone write limit. The storage device controller can be configured to transmit a write position identifier associated with the another storage location to the host computer 210.

The host computer 210 can be configured to receive the identifier from the storage device controller 222 for the write position in the SMR zone that is closer to the first write position of the SMR zone than the write position associated with the storage location identified by the data write request. The host computer 210 can transmit a partial write pointer reset command to the storage device controller 222 with the write pointer position value set to the identified write position in the SMR zone. The storage device controller 222 can be configured to receive the partial write pointer reset command and to update a write pointer for the SMR zone to indicate the identified write position.

Figure 4:
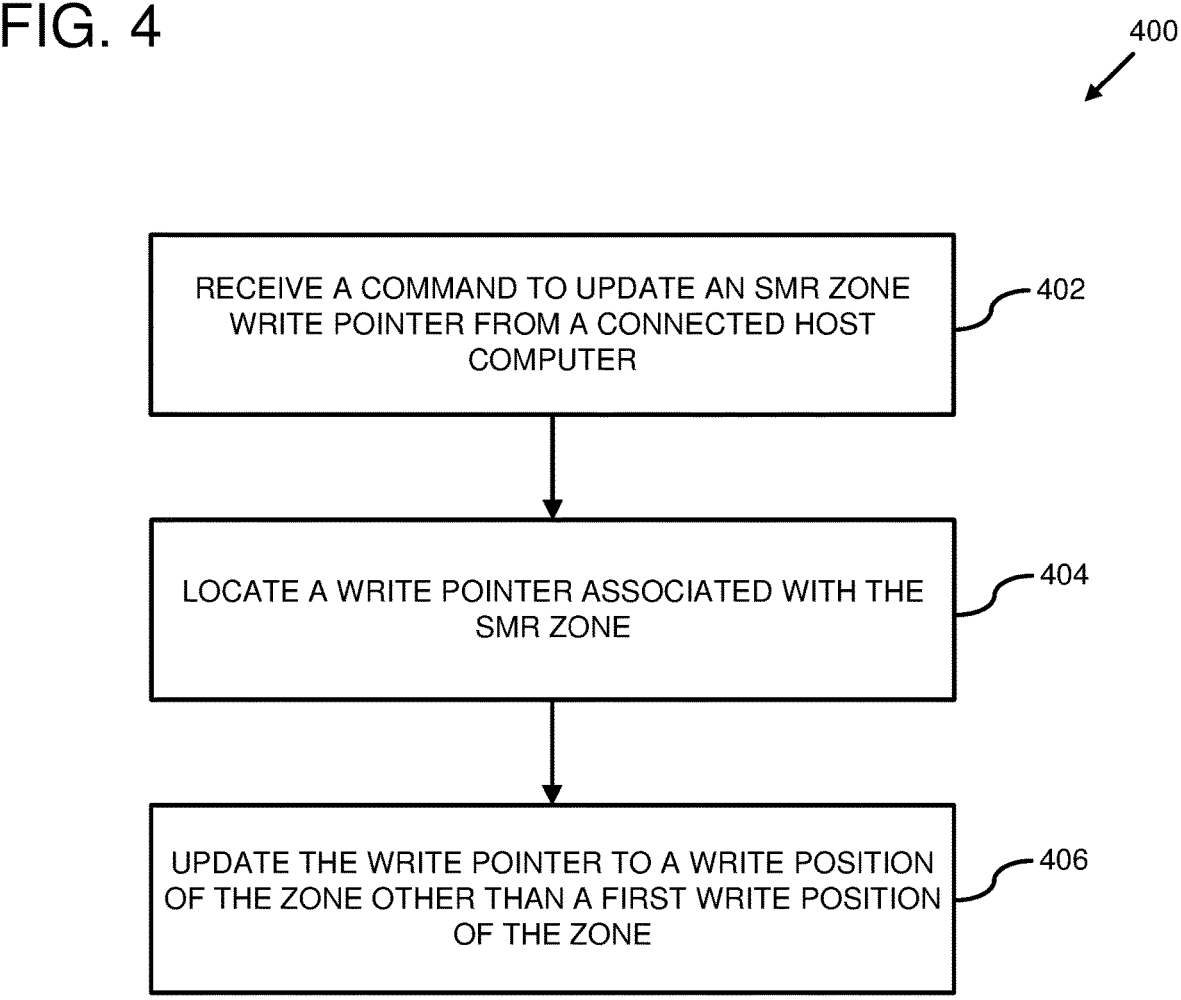
FIG. 4 is a flowchart of an example method for performing a partial write pointer update for a shingled magnetic recording (SMR) zone of a storage device.

FIG. 4 is a flowchart of an example method 400 for performing a partial write pointer update for a shingled magnetic recording (SMR) zone of a storage device. Any of the example systems described herein can be used to perform the example method 400. For example, all or part of the example method 400 can be performed by a storage device controller as described herein.

At 402, a command is received at a storage device to update a write pointer for an SMR zone of the storage device. The command is received from a host computer connected to the storage device. In at least some embodiments, the command to update the SMR zone write pointer can be received from the connected host computer via an application programming interface (API). For example, the host computer can use an API that is supported by a storage device controller that received the command, wherein the API allows assignment of a write pointer for an SMR zone to an arbitrary location within the SMR zone.

The command can comprise an identifier for a storage location in the SMR zone. For example, the command can comprise an identifier for the SMR zone and an address of the storage location (such as a logical block address (LBA) for a data block stored in the SMR zone, starting at the storage location). Additionally or alternatively, the identifier for the storage location can comprise an offset (such as a bitwise offset) from a starting address of the SMR zone. Additionally or alternatively, the identifier for the storage location can comprise a numerical value (such as an integer value) by which a value of the write pointer for the SMR zone should be decremented.

At 404, a write pointer associated with the SMR zone is located. Locating the write pointe for the SMR zone can comprise searching a store of SMR zone write pointers in a storage medium of the storage device. In at least some embodiments, a storage device controller of the storage device can maintain write pointers for one or more SMR zones of the storage device in one or more storage media of the storage device. In at least one such embodiment, the write pointers are stored in a same storage medium as one or more of the SMR storage zones of the storage device. In a different or further embodiment, the write pointers are stored using a non-shingled magnetic recording format (such as a perpendicular magnetic recording format). Additionally or alternatively, one or more of the write pointers can be stored in a non-magnetic storage medium (such as a solid state storage medium, a non-volatile memory module, etc.).

In at least some embodiments, a write pointer is maintained for each SMR zone of the storage device. The write pointers can be organized based on identifiers for the SMR zones with which they are associated. For example, the SMR zones can be assigned numerical increasing identifiers that represent an order in which the SMR zones are physically organized in a storage medium of the storage device (e.g., a first SMR zone can be assigned an identifier of 0, a second SMR zone can be assigned an identifier of 1, etc.). The write pointers for the SMR zones can be stored in an order based on the identifiers for the associated SMR zones. In at least one such embodiment, the command received at 402 can comprise an identifier for an SMR zone. The identifier can be used as an index or offset to locate the write pointer for the SMR zone.

At 406, the write pointer is updated to identify a write position in the SMR zone, other than a first write position of the SMR zone. In at least one embodiment, updating the write pointer comprises partially resetting the value of the write pointer to reference a write position that is greater than the first write position of the SMR zone and less than a last write position of the SMR zone.

In an embodiment where the command comprises an identifier of an address of a storage location, updating the write pointer can comprise determining a write position in the SMR zone at which the addressed storage location begins and setting the write pointer to a value that identifies the write position. In an embodiment where the identifier for the storage location comprises an offset from a starting address of the SMR zone, updating the write pointer can comprise determining a write position for the starting address of the SMR zone, combining the SMR zone starting address write position with the offset to create an offset write position, and setting the write pointer to a value that identifies the offset write position. In an embodiment where the identifier for the storage location comprises a numerical value by which a value of the write pointer for the SMR zone should be decremented, updating the write pointer can comprise decrementing a current value of the write pointer by the numerical value.

The updated write pointer can be written back to the storage medium of the storage device. In at least one embodiment, the command to update the SMR zone write pointer is received as part of a command to write data to the SMR zone. In such an embodiment, the data stored in the SMR zone at storage locations following the write position identified by the updated write pointer can be read, modified, and written back to a storage medium of the storage device. In at least one such embodiment, the modified data are written back to the SMR zone, starting at the storage location identified by the updated write pointer. In such an embodiment, after the write operation is complete, the write pointe can be updated to identify a write position following the last storage location to which data was written.

In at least some embodiments, the command to update the SMR zone write pointer is not a command to write "user data" to the SMR storage zone. User data are data that are transmitted to a storage device as part of one or more data write requests by a computer connected to the storage device. User data can be distinguished from "drive data" (such as write pointers, partial write counts, etc.) which are used to manage the operation of the storage device. In such an embodiment, updating the write pointer at 406 comprises updating the write pointer to indicate a write position of the SMR zone other than a first write position of the SMR zone without writing user data to the SMR zone.

Figure 5:
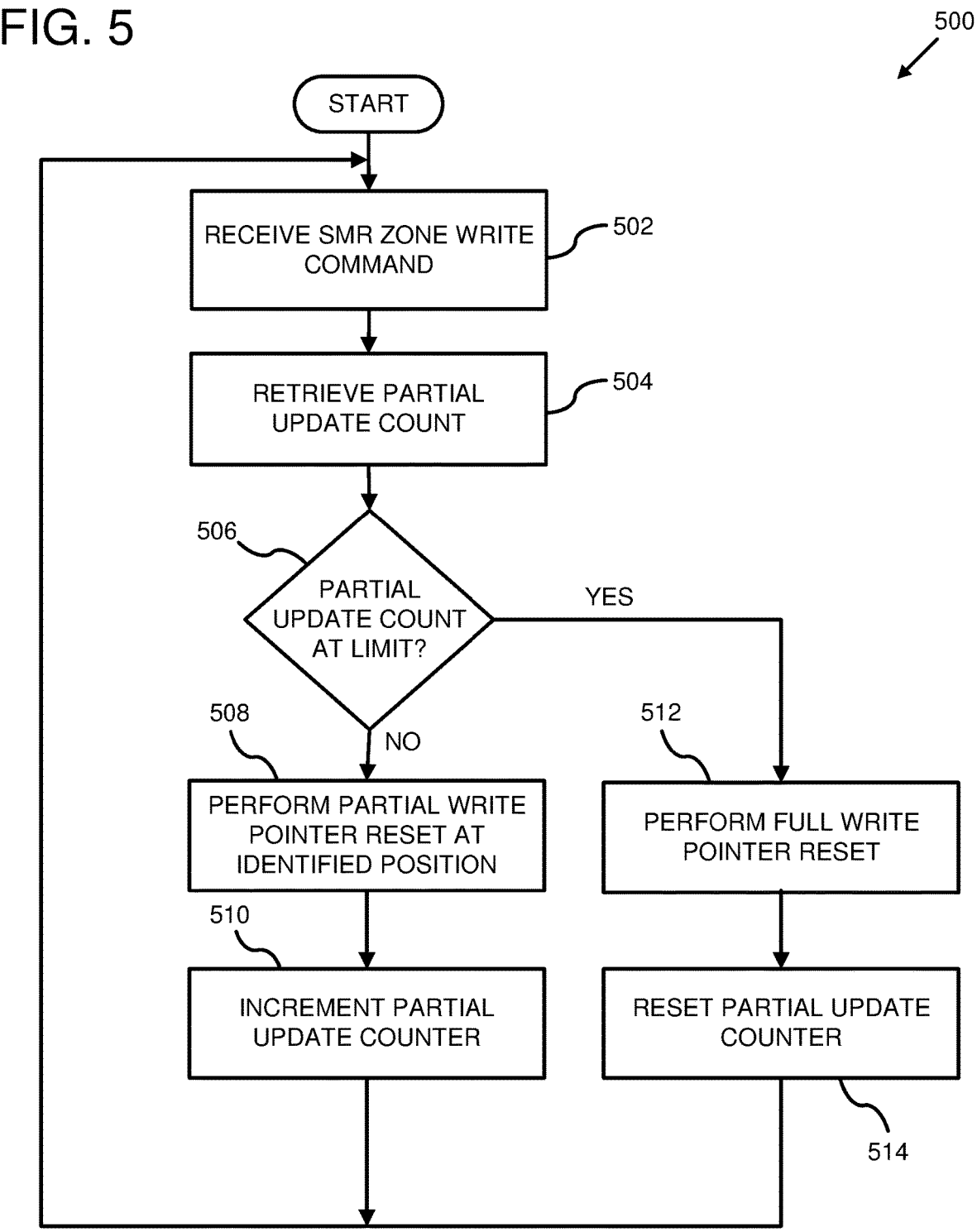
FIG. 5 is a flowchart of an example method for performing partial and full write pointer resets.

FIG. 5 is a flowchart of an example method 500 for performing partial and full write pointer reset operations based on a partial write pointer update count. Any of the example systems described herein can be used to perform the example system 500. For example, the example method 500 can be performed by a host computer, a storage device, or some combination thereof.

At 502, a command is received to store data at a write position within an SMR zone of a storage device. The command can comprise an identifier for the SMR zone of the storage device and a value indicating a write position within the SMR zone. Additionally or alternatively, the command can comprise a logical data identifier (such as a data item identifier, a data object identifier, a logical block address, etc.) for the data to be stored. The logical data identifier can be used to identify a write position within the SMR zone that is associated with the logical data identifier. For example, the command can be a command to update a data item (or data object, data block, etc.) stored in the SMR zone of the storage device, starting at the identified write position within the SMR zone.

At 504, a partial update count for the write position within the SMR zone is retrieved. Partial update counts can be tracked for write positions within the SMR zone. A partial update count for a write position within the SMR zone can be used to track a number of times that data has been written to the SMR zone when a write pointer for the SMR zone identified the write position in the SMR zone associated with the partial update counter.

In some cases, due to effects such as magnetic interference, a write operation at a write position in the SMR zone may have an impact on data stored at a previous write position in the SMR zone. In some such cases, write operations at a first write position in the SMR zone may not be at risk of having such an impact. For example, SMR zones in the storage device may be separated by buffer regions, so that write operations beginning at a first write position of one SMR zone will not impact data stored at a last write position of a previous SMR zone. However, write operations at write positions within the SMR zone other than the first write position may have an impact on data stored at a previous adjacent write position. For example, after a certain number of writes at a given write position, magnetic interference may corrupt data stored at the previous adjacent write position.

Partial update counts for the write positions within the SMR zone can be used to determine whether a write operation using a partial write pointer reset will have an impact on data stored at a previous write position in the SMR zone. Once the write position identified by the received write command is determined, a partial update count for the write position can be retrieved. In at least some embodiments, retrieving the partial update counter comprises retrieving the partial update counter from a storage medium of the storage device. For example, a storage device controller of the storage device can be configured to maintain partial update counters for the write positions in the SMR zone and to store the counters in a storage medium of the storage device. In a different or further embodiment, retrieving the partial update counter can comprise retrieving the partial update counter from a memory of a host computer connected to the storage device. For example, the host computer can be configured to maintain the partial update counts for the write positions in the SMR storage zone in the memory of the host computer and/or to cache partial update counts retrieved from the storage device in the memory of the host computer.

At 506, it is determined whether a partial update count for the write position in the SMR zone has reached a specified limit. In at least some embodiments, the specified limit represents a number of write operations that can be performed at a write position before there is a risk that data stored at a previous write position may be corrupted.

In at least some embodiments, the host computer can transmit a command to the storage device to determine whether a partial write pointer reset to an identified write position within the SMR storage zone would succeed. The storage device can receive the command and inspect a value of a partial update counter associated with the identified write position. If the value of the partial update counter is less than a specified limit, then the storage device can transmit a response to the host computer indicating that the partial write pointer reset at the identified write position would succeed. If the value of the partial update counter is greater than or equal to the specified limit, then the storage device can transmit a response to the host computer indicating that the partial write pointer reset at the identified write position would not succeed.

If the partial write count is less than the specified limit, then at 508 a partial write pointer reset operation is performed for the SMR zone. Performing the partial write pointer reset operation can comprise transmitting a command to the storage device to update a write pointer for the SMR zone to indicate the write position associated with the retrieved partial update count.

In at least some embodiments, when data is written to the SMR zone, data currently stored at the write position identified by the SMR zone's write pointer, and data stored at subsequent write positions in the SMR zone, is read, updated using the data received as part of the write command, and then written back to the SMR zone, starting at the write position identified by the write pointer.

At 510, the partial update count for the write position is incremented. In at least some embodiments, the partial update count is incremented after a write operation is performed to store data at the write position after the write pointer for the SMR zone was updated. For example, when a write operation is performed, the partial update count for the write position identified by the write pointer for the SMR zone can be retrieved and incremented. The incremented partial update count can then be saved (e.g., in a storage medium of the storage device, in a memory of the connected host computer, etc.).

If the partial write count is greater than or equal to the specified limit, then at 512 a full write pointer reset operation is performed for the SMR zone. Performing a full write pointer reset operation can comprise setting the write pointer for the SMR zone to a value that identifies a first write position of the SMR zone. In at least some embodiments, when data is written to the SMR zone, data currently stored at the write position identified by the SMR zone's write pointer, and data stored at subsequent write positions in the SMR zone, is read, updated using the data received as part of the write command, and then written back to the SMR zone, starting at the write position identified by the write pointer. In such an embodiment, when the write pointer identifies the first write position of the SMR zone, all of the data currently stored in the SMR zone is overwritten. In at least some cases, this can have the effect of removing magnetic interference introduced by previous partial updates to the ZMR zone.

In at least some embodiments, a partial write pointer reset targeting a different write position in the SMD storage zone can be performed instead of a full write pointer reset. When it is determined that the partial write count is greater than or equal to the specified limit, another write position within the SMD storage zone can be located that is associated with a partial write count that is less than the specified limit. A partial write pointer reset can then be performed to update a write pointer for the SMR zone to indicate the other write position. For example, the write pointer for the SMR zone can be updated to indicate a closest write position to the desired write position that is associated with a partial update count that is below the specified limit. In at least some cases, a write position is selected that has a partial update count less than the specified limit and that is closer to the first write position of the SMR zone than the write position associated with the retrieved partial update count. In such a scenario, the data currently stored at the write position identified by the SMR zone's write pointer, and data stored at subsequent write positions in the SMR zone, can be read, updated using the data received as part of the write command, and then written back to the SMR zone, starting at the write position identified by the write pointer. Additionally or alternatively, the data can be written to another SMR zone of the storage device.

At 514, the partial update counter for the SMR zone is reset. In at least some embodiments, when a write operation is performed that re-writes all the data stored in the SMR zone, the partial write counters for the write positions within the SMR zone can be set to zero. For example, when a write operation is performed targeting the SMR zone, the write pointer for the SMR zone is retrieved. If the write pointer has a value identifying the first write position of the SMR zone, then the partial update counters for write positions within the SMR zone can be cleared after the write operation is complete. In an embodiment where a partial write pointer reset is performed at a write position other than the write position associated with the retrieved partial update count, a partial update counter associated with the other write position can be incremented.

In at least some embodiments, the storage device is configured to periodically re-write data currently stored in the SMR zone to remove magnetic interference that may have been introduced by previous write operations. In such an embodiment, the partial update counts for the write positions within the SMR zone can be reset after such a re-write operation is performed.

Figure 6:
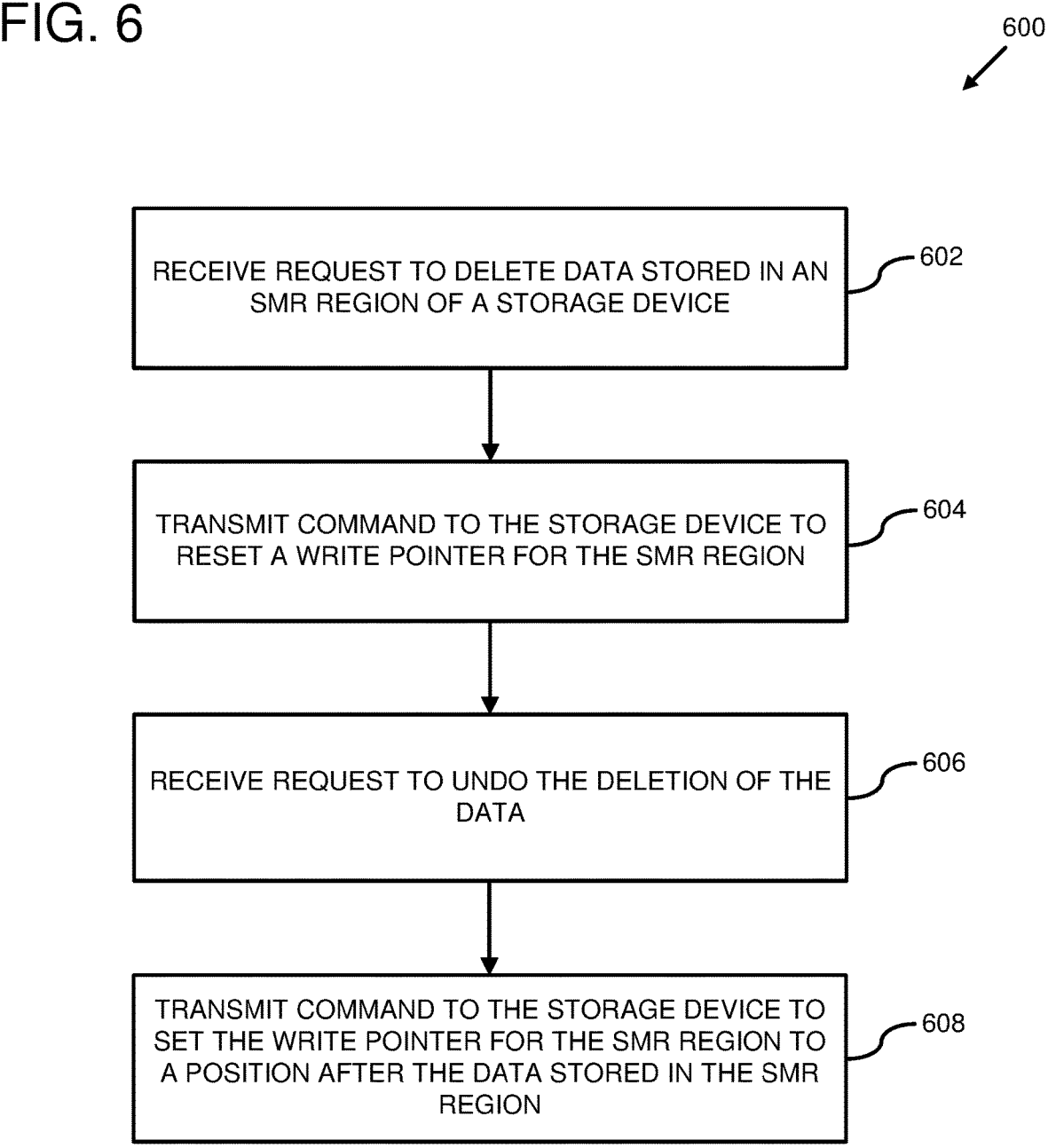
FIG. 6 is a flowchart of an example method for using a partial write pointer update to undo a delete operation.

FIG. 6 is a flowchart of an example method 600 for using a partial write pointer update to undo a delete operation. Any of the example systems described herein can be used to perform the example method 600. For example, the example method can be performed using a host computer a storage device comprising one or more shingled magnetic recording (SMR) regions, or some combination thereof.

At 602, a request is received to delete data stored in an SMR region of a storage device. In at least some embodiments, the SMR region can comprise all or part of an SMR zone of a storage medium of the storage device where data can be stored using a shingled magnetic recording format. The request can identify the data using one or more data identifiers (such as data item identifiers, data object identifiers, logical block addresses, or the like). The one or more data identifiers can be used to determine that the data are stored in the SMR region of the storage device. A write pointer for the SMR region can be used to indicate a storage location in the SMR region where a next write operation can be performed in the SMR region.

At 604, a command is transmitted to the storage device to reset a write pointer for the SMR region. In at least some embodiments, the command to reset the write pointer can be a command to perform a full write pointer reset. In such an embodiment, processing the command can comprise updating the write pointer for the SMR region to identify a position at a beginning of the SMR region (such as a first storage location in the SMR region). In a different or further embodiment, the command to reset the write pointer can be a command to perform a partial write pointer reset. In such an embodiment, processing the command can comprise updating the write pointer for the SMR region to identify a storage location in the SMR region where the data is stored. If the data is stored in more than one storage location in the SMR region (such as a case where the data is stored in multiple sequential storage locations), then processing the partial write pointer reset command can comprise updating the write pointer to identify a first storage location of the more than one storage locations where the data is stored.

A write pointer for the SMR storage region can indicate a storage location in the SMR region that is available for storing data. Thus, resetting the write pointer for the SMR region can effectively serve as a deletion of the data stored in the SMR region, since a next write operation to the SMR region will overwrite the data. When the write pointer for the SMR region is reset, a previous value of the write pointer can be preserved. For example, processing the command to reset the write pointer can comprise saving a value of the write pointer before updating the write pointer with a new value. In at least some embodiments, a current value and a previous value for the write pointer for the SMR region can be stored in a storage medium of the storage device. In a different or further embodiment, the previous value for the write pointer can be erased and/or invalidated when a write operation is performed that writes data to the SMR region. This can be done, in at least some cases, to indicate that data that was previously deleted using the write pointer reset command has now been fully or partially overwritten and is thus unrecoverable. Invalidating the previous value for the write pointer can comprise setting the previous value for the write pointer to a negative value. This can be done, in at least some embodiments where the previous value comprises a numerical write position value, by setting a sign bit of the numerical write position value. Alternatively, a special value (such as a maximum integer value) can be used to indicate that the previous value for the write pointer is invalid.

At 606, a request is received to undo the deletion of the data. The request can identify the data using the one or more data identifiers (such as data item identifiers, data object identifiers, logical block addresses, or the like). The one or more data identifiers can be used to determine that the data was stored in the SMR region of the storage device before it was deleted. Additionally or alternatively, the request can identify the SMR region of the storage device using an identifier (such as an SMR region a sequence number, etc.) associated with the SMR region.

At 608, a command is transmitted to the storage device to set the write pointer for the SMR region to a write position after the data stored in the SMR region. In at least one embodiment, a host computer retrieves the previous value for the write pointer from the storage device, determines whether the previous write pointer value is still valid and, if it is, transmits a command to the storage device to update the write pointer to the previous value of the write pointer. Alternatively, the command transmitted to the storage device can be a command to undo a write pointer update for the SMR region. The storage device, responsive to receipt of such a command, can retrieve the previous value of the write pointer determine whether the previous value is valid and, if it is, set the write pointer to the previous value.

Determining whether the previous value for the write pointer is valid can comprise determining whether the previous value for the write pointer is a negative value. This can be done, in at least some embodiments where the previous value comprises a numerical write position value, by evaluating a sign bit of the numerical write position value. Alternatively, a special value (such as a maximum integer value) can be used to indicate that the previous value for the write pointer is invalid. In such an embodiment, determining whether the previous value is valid can comprise comparing the numerical write position value to the special value.

In at least some embodiments, the command to reset the write pointer and the command to set the write pointer to a write position after the data can have a same command type. For example, the storage device can support a command to set a write pointer for an SMR region to an arbitrary write position within the SMR region. In a particular embodiment, the command comprises an identifier for the SMR region and a write position value (such as an offset) within the SMR region. In such an embodiment, the command to reset the write pointer can comprise an identifier for the SMR region and a write position value associated with the first write position within the SMR region (such as an offset value of 0). The command to set the write pointer to a position after the data can comprise the identifier for the SMR region and a write position value associated with a write position following a last storage location within the SMR region in which the data is stored. In a scenario where the deleted data included data stored in all of the storage locations of the SMR region, the write position value can be a value associated with a write position following a last storage location of the SMR region. In at least some embodiments, a write pointer that identifies a write position after an end of the SMR region can indicate that the SMR region is full.

In at least some embodiments, a storage device can be configured to receive commands to perform the delete and undo delete operations from a host computer via an API. For example, a command can be received at the storage device to delete data stored in an SMR region of the storage device from the host computer. Responsive to receiving the command, the storage device can reset the write pointer for the SMR region. Subsequently, the storage device can receive a command to undo the deletion of the date from the host computer. Responsive to receiving the command to undo the deletion, the storage device can set the write pointer for the SMR region to a position after the data stored in the SMR region.

Figure 7:
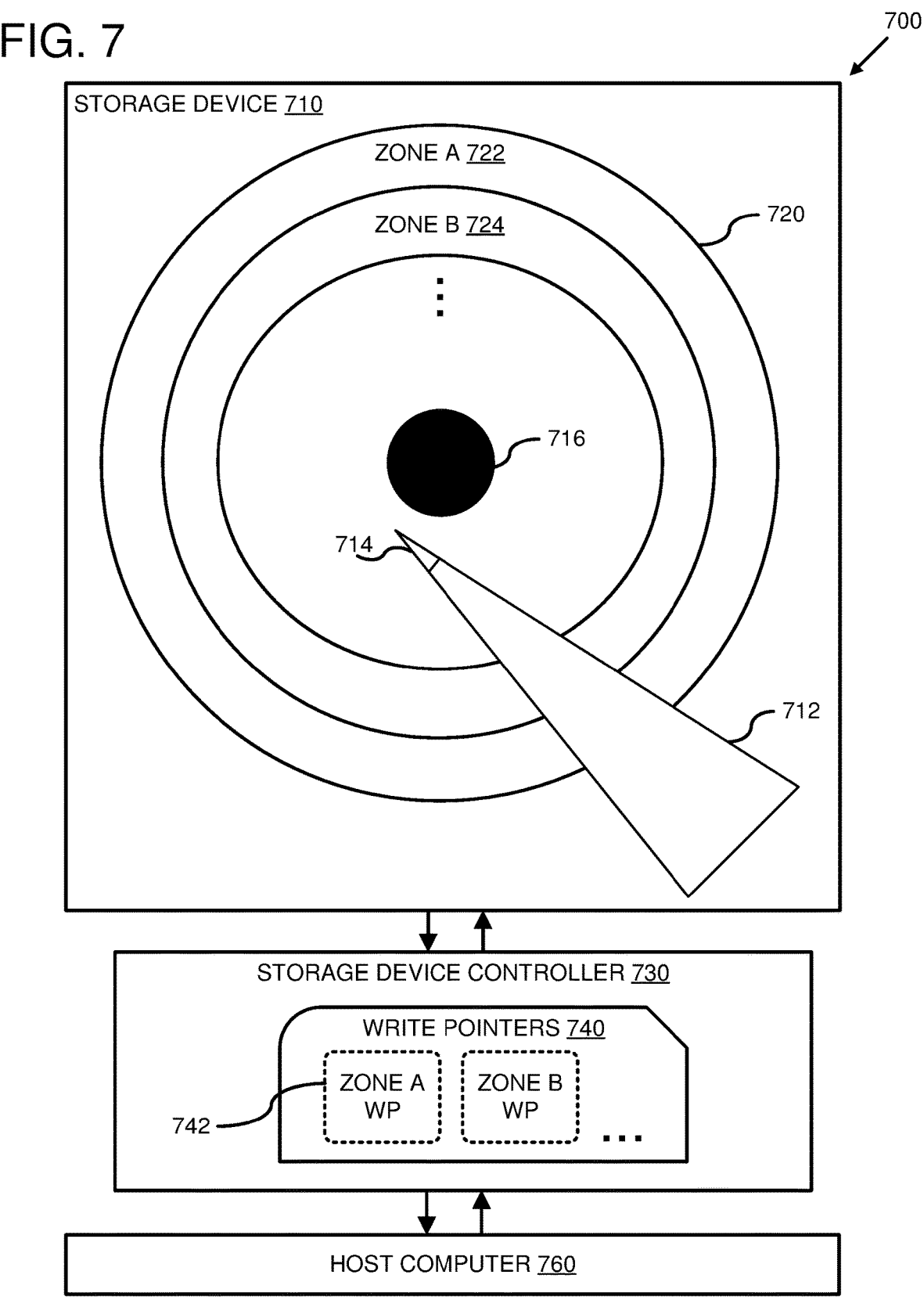
FIG. 7 is a system diagram depicting an example storage device comprising multiple SMR zones.

FIG. 7 is a system diagram depicting an example system 700 comprising a storage device 710, comprising a magnetic disk 720 comprising multiple shingled magnetic recording (SMR) zones (e.g., 722, 724, etc.), and a host computer 760 connected to the storage device 710.

A storage device controller 730 is configured to rotate magnetic disk 720 on spindle 716 and to perform data read and write operations on the magnetic disk 720 via a moveable actuator arm 712 with a read/write head 714. The actuator arm 712 can be rotated on an actuator axis (not shown) by an actuator (not shown) to move the read/write head 714 over different portions of the magnetic disk 720. The storage device controller 730 is configured to write data to and to read data from the magnetic disk 720 using the read/write head 714. The read/write head 714 can comprise a single head that can perform both read and write operations. Alternatively, the read/write head 714 can comprise two separate heads for reading and writing, respectively. The storage device controller 730 can be configured to use the read/write head 714 to write data to the magnetic disk 720 in multiple concentric circular tracks as the magnetic disk is rotated on the spindle 716.

The SMR zones can be located on one or more tracks of the magnetic disk 720. For example, the SMR zone 722 is depicted in FIG. 7 as occupying an outermost edge of the magnetic disk 520. The SMR zone 724 is depicted in FIG. 7 as being adjacent to the SMR zone 722. Data can be read from and written to data blocks of the SMR zones (e.g., 722, 724, etc.). In at least some cases, data can be written to, and read from, SMR zones that are closer to the outer edge of the magnetic disk 720 at a faster rate than data can be read from and written to SMR zones on the magnetic disk 720 that are closer to the spindle 716. Although the SMR zones 722 and 724 are depicted in FIG. 7 as occupying concentric circular tracks of the storage magnetic disk 720, this is not intended to be limiting. In at least some embodiments, it is possible for an SMR zone to occupy less than all of a writable track of the magnetic disk 720 and/or more than one track of the more than one writable track of the magnetic disk 720.

The host computer 730 can be configured to transmit commands to the storage device controller 730 to perform data read and write operations on the magnetic disk 720. The storage device controller 730 can be configured to maintain write pointers 740 for the various SMR zones. For example, the write pointer 742 can comprise a value of a current write position for the SMR zone 722. When the controller 730 receives a command from the host computer to perform a write operation targeting an SMR zone, the controller 730 can perform the write operation, at least in part, by storing data, starting at the write position in the SMR zone identified by the value of the write pointer. After the data is written to the SMR zone, the value of the write pointer can be updated to identify a write position in the SMR zone following the last write position at which the data was written.

The host computer 730 can be configured to transmit a command to the storage device controller 730 to update a write pointer for an SMR zone to identify an arbitrary write position within the SMR zone. For example, the host computer can be configured to perform a data update operation comprising the transmission of a write pointer update command. The data update operation can comprise identifying a write position in the SMR zone at which data to be updated is stored, transmitting a command to the controller 730 to update a write pointer for the SMR zone to a value identifying the write position at which the data is stored, and transmitting a command to the controller 730 to write updated data to the SMR zone. The controller 730, responsive to receipt of the data write command, can write the updated data to the SMR zone, starting at the write position identified by the updated write pointer.

In at least some embodiments, the host computer 760 can be configured to read data from the SMR zone between the write position at which the data to be updated is stored and a current value of the write pointer for the SMR zone. The host computer 760 can modify the read data, transmit the command to update the write pointer for the SMR region, and then transmit a command to write the modified data to the SMR region (or a different SMR region of the magnetic disk 720).

Although the write pointers 740 are depicted as part of the storage device controller 730 in FIG. 7, this is for illustration purposes. In practice, the write pointer values can be stored in the magnetic disk 720 and/or other storage media of the storage device 710.

Figure 8:
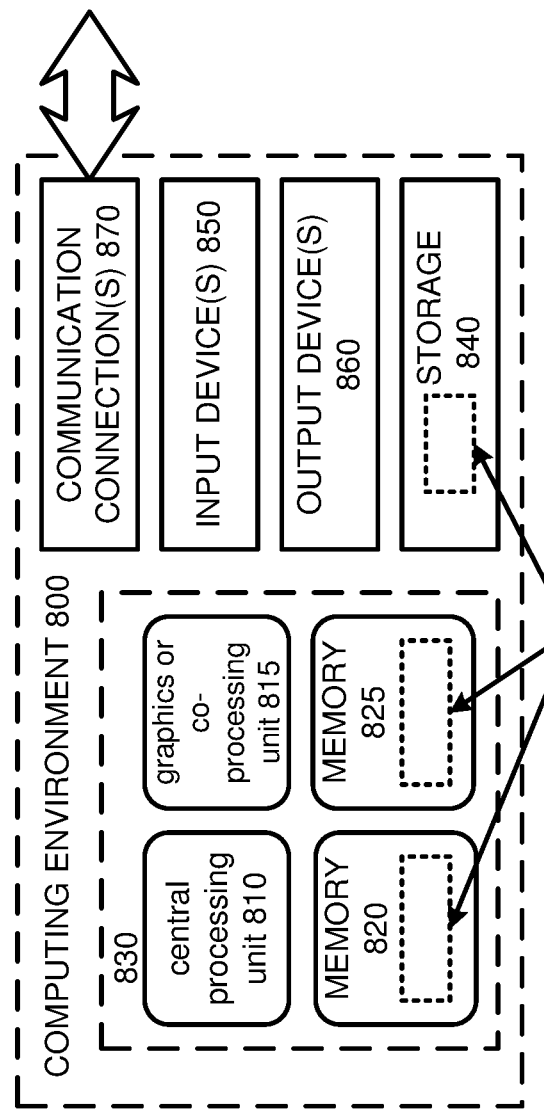
FIG. 8 depicts a generalized example of a suitable computing environment in which some of the described examples may be implemented.

FIG. 8 depicts a generalized example of a suitable computing environment 800 in which at least some of the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). The computing environment 800 can be used as a host computer in any of the examples described herein.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. For example, the storage can be a storage device as described in any of the example systems described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of the following claims.

What is claimed is:

1. A method, comprising:
receiving a command to delete data stored in a shingled magnetic recording (SMR) region of a storage device;
responsive to receiving the command to delete the data, resetting a write pointer for the SMR region;
receiving a command to undo the deletion of the data; and
responsive to receiving the command to undo the deletion of the data, undoing the deletion of the data, wherein undoing the deletion comprises using a partial write pointer update to set the write pointer for the SMR region to a write position after the data stored in the SMR region of the storage device.

2. The method of claim 1, wherein the resetting the write pointer for the SMR region comprises transmitting a write pointer reset command to the storage device.

3. The method of claim 1, wherein:
the command to delete the data comprises an identifier associated with the data; and
the method further comprises:
using the identifier to determine that the data is stored in the SMR region of the storage device; and
retrieving the write pointer for the SMR region from a storage medium of the storage device.

4. The method of claim 3, wherein the retrieving the write pointer for the SMR region from the storage medium of the storage device comprises retrieving the write pointer from another storage region of the storage device.

5. The method of claim 1, wherein:
the resetting the write pointer for the SMR region comprises storing a previous value of the write pointer; and
the setting the write pointer for the SMR region to the write position after the data stored in the SMR region of the storage device comprises setting the write pointer for the SMR region to the previous value of the write pointer.

6. The method of claim 1, wherein the setting the write pointer for the SMR region to the write position after the data stored in the SMR region of the storage device comprises:
determining that a previous value for the write pointer is valid; and
setting the write pointer for the SMR region to the previous value of the write pointer.

7. The method of claim 6, wherein the determining that the previous value for the write pointer is valid comprises determining that data has not been written to the SMR region since the resetting of the write pointer for the SMR region.

8. A system, comprising:
a storage device comprising a shingled magnetic recording (SMR) storage zone; and
a host computer connected to the storage device, wherein the host computer is configured to:
receive a command to delete data stored in the SMR storage zone of the storage device;
responsive to receiving the command to delete the data, reset a write pointer for the SMR storage zone;
receive a command to undo the deletion of the data; and
responsive to receiving the command to undo the deletion of the data, undoing the deletion of the data, wherein the undoing the deletion comprises using a partial write pointer update to set the write pointer for the SMR storage zone to a write position after the data stored in the SMR storage zone of the storage device.

9. The system of claim 8, wherein the resetting the write pointer for the SMR storage zone comprises transmitting a write pointer reset command to the storage device.

10. The system of claim 8, wherein:
the command to delete the data comprises an identifier associated with the data; and
the host computer is further configured to:
use the identifier to determine that the data is stored in the SMR storage zone of the storage device; and
retrieve the write pointer for the SMR storage zone from a storage medium of the storage device.

11. The system of claim 10, wherein the retrieving the write pointer for the SMR storage zone from the storage medium of the storage device comprises retrieving the write pointer from another storage zone of the storage device.

12. The system of claim 8, wherein:
the resetting the write pointer for the SMR storage zone comprises storing a previous value of the write pointer; and
the setting the write pointer for the SMR storage zone to the write position after the data stored in the SMR storage zone of the storage device comprises setting the write pointer for the SMR storage zone to the previous value of the write pointer.

13. The system of claim 8, wherein the setting the write pointer for the SMR storage zone to the write position after the data stored in the SMR storage zone of the storage device comprises:
determining that a previous value for the write pointer is valid; and
setting the write pointer for the SMR storage zone to the previous value of the write pointer.

14. The system of claim 13, wherein the determining that the previous value for the write pointer is valid comprises determining that data has not been written to the SMR storage zone since the resetting of the write pointer for the SMR storage zone.

15. A computing device comprising a processor and a memory storing instructions that, when executed by the processor, cause the computing device to perform operations, the operations comprising:
receiving a command to delete data stored in a shingled magnetic recording (SMR) storage zone of a storage device;
responsive to receiving the command to delete the data, resetting a write pointer for the SMR storage zone;
receiving a command to undo the deletion of the data; and
responsive to receiving the command to undo the deletion of the data, undoing the deletion of the data, wherein undoing the deletion comprises using a partial write pointer update to set the write pointer for the SMR storage zone to a write position after the data stored in the SMR storage zone of the storage device.

16. The computing device of claim 15, wherein the resetting the write pointer for the SMR storage zone comprises transmitting a write pointer reset command to the storage device.

17. The computing device of claim 15, wherein:
the command to delete the data comprises an identifier associated with the data; and
the operations further comprise:
using the identifier to determine that the data is stored in the SMR storage zone of the storage device; and
retrieving the write pointer for the SMR storage zone from a storage medium of the storage device.

18. The computing device of claim 15, wherein:
the resetting the write pointer for the SMR storage zone comprises storing the previous value of the write pointer; and
the setting the write pointer for the SMR storage zone to the write position after the data stored in the SMR storage zone of the storage device comprises setting the write pointer for the SMR storage zone to the previous value of the write pointer.

19. The computing device of claim 15, wherein the setting the write pointer for the SMR storage zone to the write position after the data stored in the SMR storage zone of the storage device comprises:
determining that a previous value for the write pointer is valid; and
setting the write pointer for the SMR storage zone to the previous value of the write pointer.

20. The computing device of claim 19, wherein the determining that the previous value for the write pointer is valid comprises determining that data has not been written to the SMR region since the resetting of the write pointer for the SMR region.

* * * * *